(12) United States Patent
Isohätälä et al.

(10) Patent No.: US 11,292,166 B2
(45) Date of Patent: Apr. 5, 2022

(54) METHOD FOR MANUFACTURING AN ELECTRONIC ASSEMBLY AND AN ELECTRONIC ASSEMBLY

(71) Applicant: TactoTek Oy, Oulunsalo (FI)

(72) Inventors: Anne Isohätälä, Oulunsalo (FI); Hasse Sinivaara, Oulunsalo (FI); Mikko Heikkinen, Oulunsalo (FI)

(73) Assignee: TACTOTEK OY, Oulunsalo (FI)

( * ) Notice: Subject to any disclaimer, the term of this patent is extended or adjusted under 35 U.S.C. 154(b) by 432 days.

(21) Appl. No.: 15/481,976

(22) Filed: Apr. 7, 2017

(65) Prior Publication Data

US 2018/0290356 A1 Oct. 11, 2018

(51) Int. Cl.
*B29C 45/14* (2006.01)
*B29C 45/16* (2006.01)
(Continued)

(52) U.S. Cl.
CPC ........ *B29C 45/14639* (2013.01); *B29B 11/06* (2013.01); *B29C 45/1642* (2013.01);
(Continued)

(58) Field of Classification Search
CPC .......... B29C 45/14639; B29C 45/1671; B29C 45/1642; B29C 2045/14663;
(Continued)

(56) References Cited

U.S. PATENT DOCUMENTS 9,431,710 B2 * 8/2016 Huang .............. H01Q 1/38
10,335,987 B2 * 7/2019 Ludwig ............ H01L 33/58
(Continued)

FOREIGN PATENT DOCUMENTS

DE 102011076717 A1 12/2012
DE 102014106585 A1 11/2015
(Continued)

OTHER PUBLICATIONS

International Search Report issued by the European Patent Office acting as the International Searching Authority in relation to International Application No. PCT/FI2018/050243 dated Jul. 24, 2018 (5 pages total).

(Continued)

*Primary Examiner* — Niki Bakhtiari
*Assistant Examiner* — John J DeRusso
(74) *Attorney, Agent, or Firm* — Robert P. Michal, Esq.; Carter, DeLuca & Farrell LLP

(57) ABSTRACT

A method, for manufacturing an electronic assembly, such as an antenna or a capacitive sensing device or a coupled inductor, comprising at least a first electrically conductive element and a second electrically conductive element is presented. The method comprises obtaining said electrically conductive elements, such as patch elements, arranging said electrically conductive elements, such as inside of a cavity defined by a mold structure, at a pre-defined distance from each other for establishing an electromagnetic coupling between said electrically conductive elements, and molding, such as injection molding, a molding material layer at least between said electrically conductive elements, wherein the molding material layer has a thickness between said electrically conductive elements defined by the pre-defined distance. In addition, electronic assemblies, antennas, capacitive sensing devices and coupled inductors are presented.

7 Claims, 8 Drawing Sheets

(51) Int. Cl.
*G01D 5/24* (2006.01)
*H01F 27/28* (2006.01)
*H01F 38/14* (2006.01)
*H01F 41/04* (2006.01)
*B29L 31/34* (2006.01)
*H01Q 9/04* (2006.01)
*B29B 11/06* (2006.01)
*B29K 705/00* (2006.01)

(52) U.S. Cl.
CPC ........... *B29C 45/1671* (2013.01); *G01D 5/24* (2013.01); *H01F 27/28* (2013.01); *H01F 38/14* (2013.01); *H01F 41/04* (2013.01); *H01Q 9/0407* (2013.01); *B29C 2045/14532* (2013.01); *B29C 2045/14663* (2013.01); *B29K 2705/00* (2013.01); *B29L 2031/3406* (2013.01); *B29L 2031/3456* (2013.01); *Y10T 29/49016* (2015.01)

(58) Field of Classification Search
CPC ........ B29C 2045/14532; H01Q 9/0407; H01F 41/04; H01F 38/14; H01F 27/28; G01D 5/24; B29B 11/06; Y10T 29/49016; B29L 2031/3456; B29L 2031/3406; B29K 2705/00
See application file for complete search history.

(56) References Cited

U.S. PATENT DOCUMENTS

| | | | | |
|---|---|---|---|---|
| 2007/0271780 | A1* | 11/2007 | Allemann | H03K 17/952 29/841 |
| 2008/0018551 | A1* | 1/2008 | Cheng | G06F 1/1616 343/873 |
| 2012/0098115 | A1* | 4/2012 | Watanabe | H01L 25/0657 257/690 |
| 2012/0285611 | A1* | 11/2012 | Desclos | H01Q 5/378 156/222 |
| 2012/0306496 | A1* | 12/2012 | Popescu | G01R 33/34007 324/322 |
| 2016/0363555 | A1 | 12/2016 | Kang et al. | |
| 2017/0094800 | A1* | 3/2017 | Keranen | H05K 1/0269 |
| 2017/0179581 | A1* | 6/2017 | Puuri | H01Q 7/005 |
| 2017/0301460 | A1 | 10/2017 | Ishida | |
| 2018/0159229 | A1* | 6/2018 | Britz | B29C 35/02 |

FOREIGN PATENT DOCUMENTS

| | | |
|---|---|---|
| EP | 0665584 A1 | 8/1995 |
| EP | 1837149 A1 | 9/2007 |
| JP | 2016059077 A | 4/2016 |
| NL | 9400119 A | 9/1995 |

OTHER PUBLICATIONS

Written Opinion of the International Searching Authority issued by the European Patent Office acting as the International Searching Authority in relation to International Application No. PCT/FI2018/050243 dated Jul. 24, 2018 (5 pages).
Second Written Opinion of the International Preliminary Examining Authority issued by the European Patent Office acting as the International Preliminary Examining Authority in relation to International Application No. PCT/FI2018/050243 dated Apr. 24, 2019 (7 pages).
Office Action issued in U.S. Appl. No. 16/561,213 dated Apr. 1, 2020 (18 pages).
Office Action dated Jun. 18, 2020 issued in U.S. Appl. No. 16/561,213.
India Examination Report for application No. 201917044826 dated May 21, 2021 with English Translation.
Office Action issued by the Korean Patent Office in relation to Korean Application No. 10-2019-7031713 dated Jul. 1, 2021 (7 pages) along with English language translation (5 pages).
Office Action issued in U.S. Appl. No. 16/561,213 dated Jul. 27, 2021 (16 pages).
Final Office Action issued in U.S. Appl. No. 16/561,213, dated Oct. 27, 2021, 16 pages.
Notice of Allowance issued in corresponding U.S. Appl. No. 16/561,213, dated Jan. 19, 2022, 16 pages.

* cited by examiner

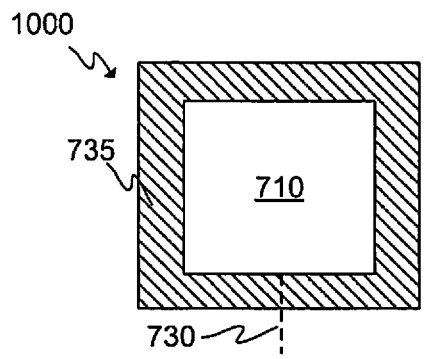
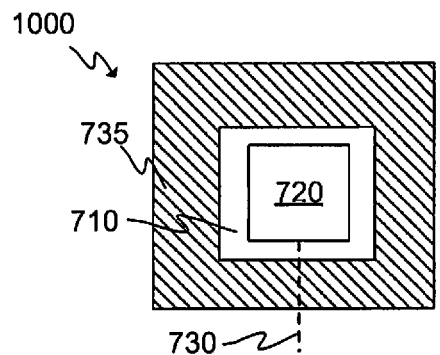
FIG. 7A  FIG. 7B
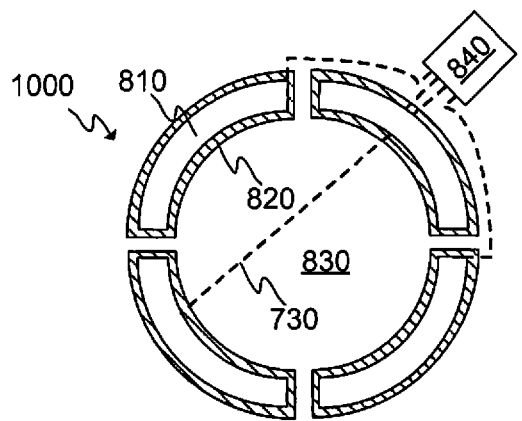
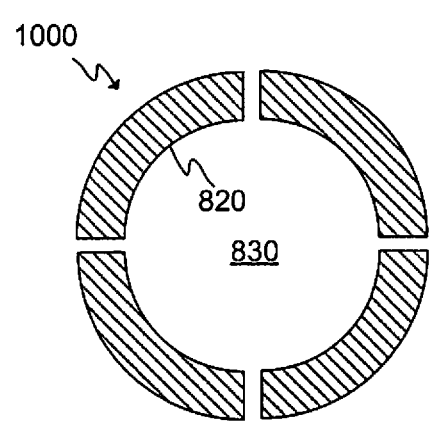
FIG. 8A  FIG. 8B
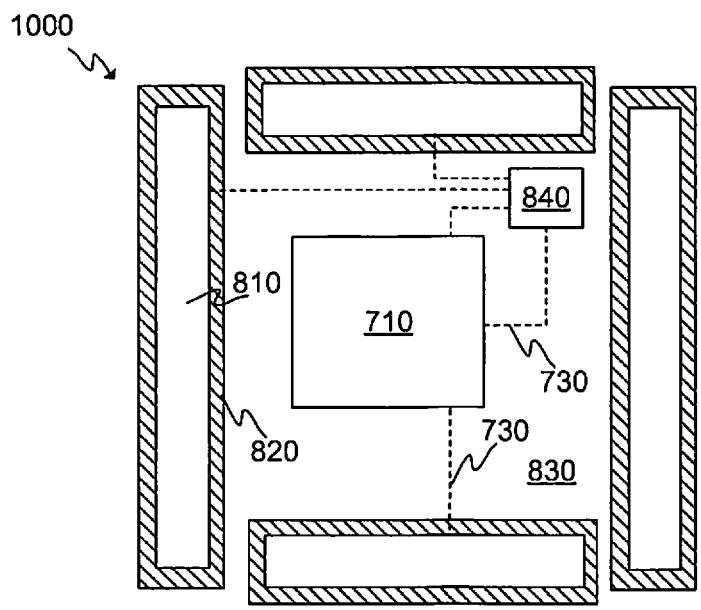
FIG. 9

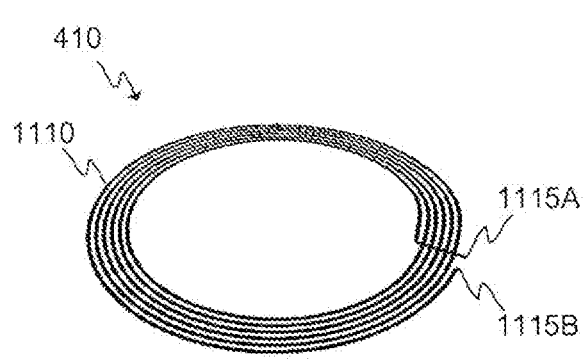
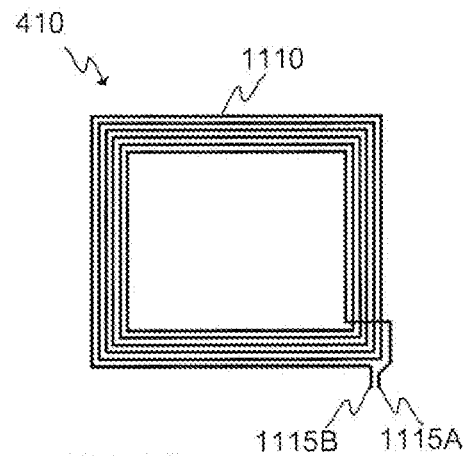
FIG. 11A          FIG. 11B
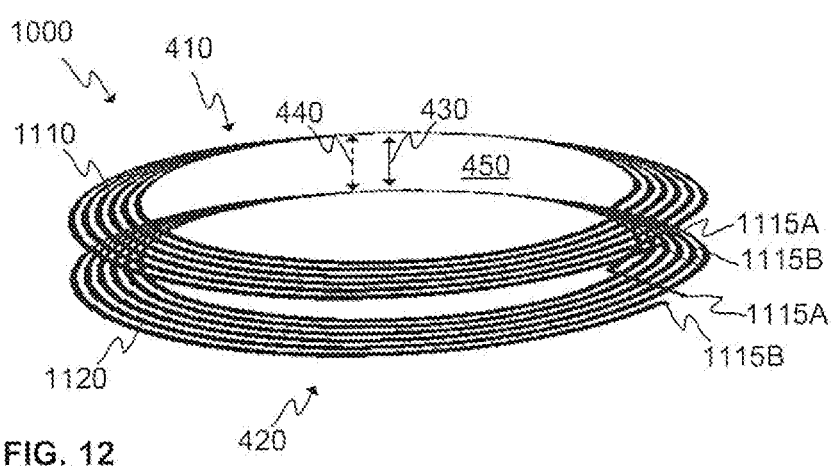
FIG. 12 but # METHOD FOR MANUFACTURING AN ELECTRONIC ASSEMBLY AND AN ELECTRONIC ASSEMBLY The project leading to this application has received funding from the European Union's Horizon 2020 research and innovation programme under grant agreement No 725076.

TECHNICAL FIELD

The present invention concerns in general the technical field of electronics. Especially, however, not exclusively, the present invention concerns manufacturing of electronic assemblies utilizing molding, such as injection molding, and such electronic assemblies comprising a molded layer.

BACKGROUND

A variety of different multilayer structures exists in general in the context of electronics and electronic products. Multilayered structures may be manufactured using thermoforming, molding, adhesives, heat and/or pressure based lamination, etc. In-mold decoration (IMD)/in-mold labeling (IML) may be harnessed to incorporate desired coloring and e.g. graphical patterns within the structure.

Electronics such as electronic components, integrated circuits (ICs), and conductors, may generally be provided into or onto a multilayer structure by a plurality of different techniques. Naturally, ready-made electronics such as available surface mount devices (SMD) may be mounted on a substrate that ultimately forms an inner or outer layer of a multilayer structure. Additionally, technologies falling under the term "printed electronics" may be applied to actually produce electronics directly to the associated substrate. The term "printed" refers in this case to various printing techniques capable of producing electronics/electrical elements, including, however, not limited to, screen printing, flexography, and inkjet printing.

In attempted solutions, the electronic components have been arranged on a substrate after which the components are overmolded by thermoplastic material. The products may comprise components or devices, such as ICs, conductors, and antennas, which are manufactured first as ready-made components having the designed properties or operational characteristics, and then coupled or integrated, for example, on a printed circuit board (PCB), which is then overmolded by molding material for protecting the component.

In an attempted solution, a antenna device, which is overmolded to be part of a product and having capacitive coupling between its antenna elements, is produced utilizing at least three different metal parts, that is, the radiator, the feeding element and the ground plane, and at least three separate insulating support parts, which are the supporting frame between the metal parts, that is, an insulating substrate, the top cover and the bottom cover.

There is still need for developing a method for manufacturing of the electronic assemblies which facilitates the production of these assemblies without the need for as many production steps as with known methods and, furthermore, facilitates the integration of the electronic assemblies into the products.

SUMMARY

An objective of the present invention is to present a method for manufacturing electronic assemblies and electronic assemblies. Another objective of the present invention is that the method facilitates the manufacturing of the electronic assemblies.

The objectives of the present invention are reached by a method and electronic assemblies as defined by the respective independent claims.

According to a first aspect, a method for manufacturing an electronic assembly for emitting a responsive field, such as an electromagnetic field of an antenna or an electric field of a capacitive sensing device or a magnetic field of an inductor is provided. Such a responsive field may be included, for example, in an antenna structure or a capacitive sensing device designed for emitting/transmitting and/or receiving electromagnetic radiation or at least to be sensitive to changes in the established electrical field, or in a coupled inductor having a magnetic field between inductors thereof, therefore, wirelessly transferring information and/or electric power between the assembly and an environment in which the assembly is intended to be utilized. The method comprises at least a first electrically conductive element and a second electrically conductive element. The method comprises:

obtaining said electrically conductive elements, such as patch elements or planar coils, arranging said electrically conductive elements, such as inside of a cavity defined by a mold structure, at a pre-defined distance from each other for establishing an electromagnetic, such as a capacitive or an inductive, coupling between said electrically conductive elements, and molding, such as injection molding, a molding material layer at least between said electrically conductive elements, wherein the molding material layer has a thickness between said electrically conductive elements defined by the pre-defined distance.

The method may comprise obtaining a first substrate film, and providing, optionally through utilizing printed electronics technology such as screen printing, the first electrically conductive element to the first substrate film.

The method may comprise obtaining a second substrate film, and providing, optionally through utilizing printed electronics technology such as screen printing, the second electrically conductive element to the second substrate film.

The method may comprise forming, such as thermoforming or cold forming, at least one of the first and second substrate films to a desired three-dimensional (3D) shape. The desired 3D shape may refer to so called two and a half dimensional (2.5D) or preudo-3D shape in which the object exhibits 3D shape with respect to one direction only, for example, the surface of the side of a cylinder, or any 3D shape having a complex shape with various different local curvatures.

The method may comprise obtaining a third electrically conductive element, preferably a patch element, and arranging the third electrically conductive element on the same side of the molding material layer as the first or the second electrically conductive element for operating as a ground element of the electronic assembly.

The method may comprise coupling an electrical energy feeding element, such as a signal feeding element and/or a controlling unit, to the first or the second electrically conductive element.

According to a second aspect, an electronic assembly for emitting a responsive field is provided. The electronic assembly comprises:

a first electrically conductive element, and a second electrically conductive element, wherein said electrically conductive elements are electromagnetically, and preferably wirelessly such as capacitively or inductively, coupled to each other; and the electronic assembly comprises a molding material layer at least between the first and the second electrically conductive elements.

The distance of the electrically conductive elements of the assemblies from each other may, preferably, be such that the operational characteristics of the electronic assembly are suitable for the intended purpose of the assembly, such as frequency band of the antenna, frequency bandwidth and the impedance matching in case of an antenna structure, or the desired capacitance between the elements. In case of a capacitive sensing device aspects may have needed to be taken into account such as the distance of the receive (Rx) electrode from the transmit (Tx) electrode, which is affects the shielding capability of the Tx electrode, the desired capacitances, the permeability of the molding material, or the desired sensor signal strength. In case of a coupled inductor, the distance may be advantageously chosen taking into account the desired inductance of the inductor, for example, in order to maximize the inductance or at least the mutual inductance between the coils. This may be affected by the amount of conductive layers of the planar coil(s), spacing between the turns of the coil(s), the width of the conductor forming the planar coil(s), number of turns in the planar coil(s), or the diameter or size of the planar coils with respect to each other or the horizontal displacement between the planar coils, if they are not arranged directly on top of each other in the vertical direction, that is, perpendicular to the horizontal direction defined by the plane of the planar coil. Also magnitude and/or shape of the surface areas inside the planar coils with respect to each other may affect the designing of the pre-defined distance.

The electrically conductive elements, such as conductive patch elements of an antenna or a capacitive sensing device, may be capacitively coupled to each other.

The electrically conductive elements, such as planar coils of a coupled inductor, may be inductively coupled to each other.

The first electrically conductive element may be arranged on a first substrate film.

The second electrically conductive element may be arranged on a second substrate film, and the molding material layer may be molded at least between the first and the second substrate films.

The at least one of the first and the second electrically conductive member may have a three-dimensional (3D) shape. The 3D shape may refer to so called two and a half dimensional (2.5D) or preudo-3D shape in which the object exhibits 3D shape with respect to one direction only, for example, the surface of the side of a cylinder, or any 3D shape having a complex shape with various different local curvatures.

The at least one of the first and the second substrate film may have a three-dimensional shape.

According to a third aspect, a method for manufacturing an antenna structure comprising at least a first antenna element and a second antenna element is provided. The method comprises:

obtaining said antenna elements, such as patch antenna elements, arranging said antenna elements, such as inside of a cavity defined by a mold structure, at a pre-defined distance from each other for establishing a capacitive coupling between said antenna elements, and molding, such as injection molding, a molding material layer at least between said antenna elements, wherein the molding material layer has a thickness between said antenna elements defined by the pre-defined distance.

The method may comprise defining the pre-defined distance based on desired operational characteristics of the antenna structure, such as based on a desired operation frequency band.

According to a fourth aspect, an antenna structure is provided. The antenna structure comprises:

a first antenna element, such as a patch antenna element, and a second antenna element, such as a patch antenna element, wherein said antenna elements are capacitively coupled to each other; and the antenna structure comprises a molding material layer at least between the first and the second antenna elements.

According to a fifth aspect, a method for manufacturing a capacitive sensing device comprising at least a first sensing element and a second sensing element is provided. The method comprises:

obtaining said sensing elements, such as conductive patch elements, arranging said sensing elements, such as inside of a cavity defined by a mold structure, at a pre-defined distance from each other for establishing a capacitive coupling between said sensing elements, and molding, such as injection molding, a molding material layer at least between said sensing elements, wherein the molding material layer has a thickness between said sensing elements defined by the pre-defined distance.

According to a sixth aspect, a capacitive sensing device is provided. The capacitive sensing device comprises:

a first sensing element, such as a conductive patch element, and a second sensing element, such as a conductive patch element, wherein said sensing elements are capacitively coupled to each other; and the capacitive sensing device comprises a molding material layer at least between the first and the second sensing elements.

According to a seventh aspect, a method for manufacturing a coupled inductor comprising at least a first inductor and a second inductor is provided. The method comprises:

obtaining said inductors, such as conductive planar coils, arranging said inductors, such as inside of a cavity defined by a mold structure, at a pre-defined distance from each other for establishing a, preferably mutually, inductive coupling between said inductors, and molding, such as injection molding, a molding material layer at least between said inductors, wherein the molding material layer has a thickness between said inductors defined by the pre-defined distance.

According to an eighth aspect, a coupled inductor is provided. The coupled inductor comprises a first inductor, such as a conductive planar coil, and a second inductor, such as a conductive planar coil, wherein said inductors are mutually inductively coupled to each other; and the coupled inductor comprises a molding material layer molded at least between the first and the second inductors.

The utility of the present invention arises from a plurality of issues depending on the embodiment. Multilayer electronic assemblies, such as antennas and/or capacitive sensing devices and/or coupled inductors, may be manufactured easily by arranging the electrically conductive elements, such as antenna elements or capacitive sensing elements or inductors at pre-defined distances from each other taking into account the desired properties or characteristics of the resulting assembly or product. By molding the insulating layer over which the electromagnetic coupling is being established reduces the amount of production steps with respect to earlier attempted solutions according to which the antenna or capacitive sensing device or a coupled inductor is first produced separately and the integrated into the device or product, for example, by connecting it to a PCB or by overmolding. Thus the present invention facilitates the manufacturing of these devices.

The terms "first", "second", "third", "fourth", "fifth", "sixth", "seventh" or "eighth" do not denote any order, quantity, or importance, but rather are used to distinguish one element from another.

The exemplary embodiments of the present invention presented herein are not to be interpreted to pose limitations to the applicability of the appended claims. The verb "to comprise" is used herein as an open limitation that does not exclude the existence of also un-recited features. The features recited in depending claims are mutually freely combinable unless otherwise explicitly stated.

The novel features which are considered as characteristic of the present invention are set forth in particular in the appended claims. The present invention itself, however, both as to its construction and its method of operation, together with additional objectives and advantages thereof, will be best understood from the following description of specific embodiments when read in connection with the accompanying drawings.

BRIEF DESCRIPTION OF FIGURES

The embodiments of the present invention are illustrated by way of example, however, not by way of limitation, in the figures of the accompanying drawings which are briefly described in the following.

FIGS. 7A and 7B illustrate an antenna structure according to an embodiment of the present invention.

FIGS. 8A and 8B illustrate a capacitive sensing device according to an embodiment of the present invention.

FIG. 9 illustrates an electronic assembly according to an embodiment of the present invention.

FIGS. 11A and 11B illustrate inductors according to two embodiments of the present invention.

FIG. 12 illustrates a coupled inductor according to an embodiment of the present invention.

DESCRIPTION OF SOME EMBODIMENTS

Figure 1:
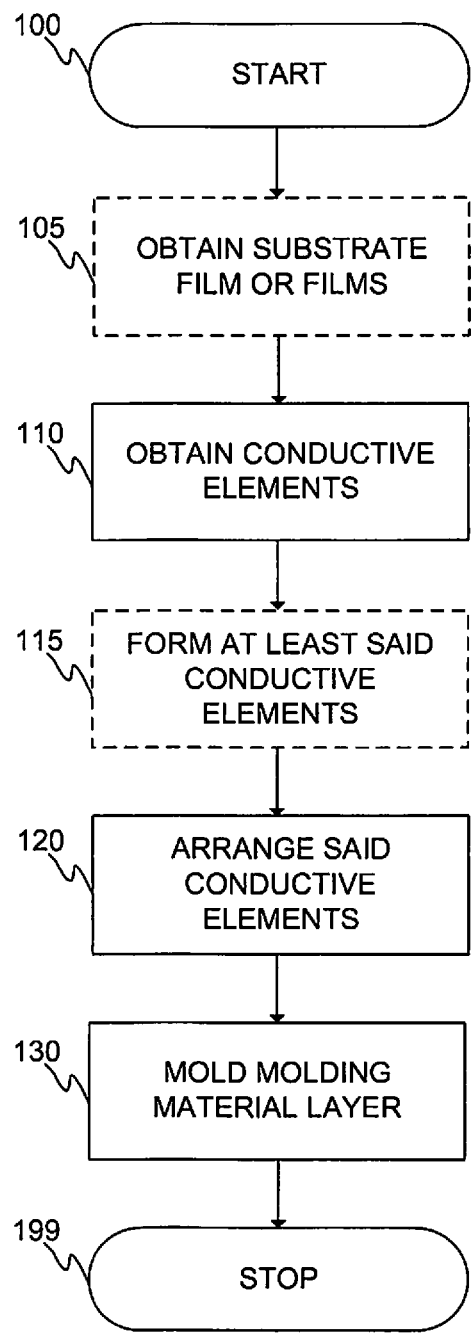
FIG. 1 illustrates a flow diagram of a method in accordance with an embodiment of the present invention.

FIG. 1 illustrates a flow diagram of a method in accordance with an embodiment of the present invention. Optional steps, such as 105 and 115, are marked in FIG. 1 with dashed lines.

At 100, referring to a start-up phase, the necessary tasks such as material, components, such as electrical contact pads, electronics components and connectors, and tools selection, acquisition, calibration and other configuration may take place. Specific care must be taken that the individual elements and material selections work together and survive the selected manufacturing process and possible target product whereto the structure may be disposed, which is naturally preferably checked up-front on the basis of the manufacturing process specifications and component data sheets, or by investigating and testing the produced prototypes, for example. Molding, such as injection molding, In-mold Decoration (IMD)/In-mold Labelling (IML), lamination, and/or printing equipment, among others, may be thus ramped up to operational status at this stage.

At optional step 105, a preferably flexible, substrate film or films, such as for accommodating electronics, may be obtained. Optionally, prior to or at step 105, decorations, graphical indications, colors etc. may be produced onto the film by printing, for instance. This may be omitted or position thereof altered in the method flow. Alternatively or in addition, other layers such as a protective layer could be provided with such features. For example, screen printing or inkjet printing may be applied. Decorative or indicative (e.g. instructive) features may be generally provided using IMD/IML compatible methods. Ready-made substrate material, e.g. roll of plastic film, may be acquired and optionally processed such as coated, colored (if not initially of desired color or e.g. optimum degree of transparency or translucency), carved, embossed, shaped, etc., or the substrate itself may be in-house produced from scratch by molding or other methods from the desired starting material(s). The substrate film or films may be obtained as already having three-dimensional shapes. In case of substrate film or films having three-dimensional shapes, the substrate film(s) may, optionally, be formed further at step 115.

Having regard to potential properties of the substrate film(s) or sheet(s), the substrate film(s) or sheet(s) may, preferably, be flexible. The substrate film(s) or sheet(s) may comprise e.g. plastics/polymer, such as Poly Carbonate (PC), Poly Carbonate/Acrylonitrile butadiene styrene (PC/ABS), Poly Methyl Methacrylate (PMMA), polyimide, a copolymer of Methyl Methacrylate and Styrene (MS resin), Polyethylene Terephthalate (PET), or metal. The substrate film(s) or sheet(s) may comprise organic or biomaterials, such as wood, leather or fabric, or a combination of any of these materials with each other or with plastics or polymers or metals. These materials may also be utilized in the molded layer and/or protective layer. The substrate film(s) or sheet(s) may also be further processed, such as shaped, formed, coated, etc.

The substrate film or films may include relief forms or shapes such as protrusions, ridges, grooves, or recesses relative to the surface plane of the film, optionally through holes. These features may be utilized to accommodate or at least partially embed elements such as conductors, components, etc. within the substrate film(s). Similar features may be present in the protective layer.

According to an embodiment of the present invention, at step 105, two, preferably flexible, substrate films, such as described hereinabove, may be obtained. The substrate films may be similar or different relative to each other. One or both of them may be for accommodating electronics, such as electronics components or conductors or conductive areas, e.g., patches or planar coils. The films may have three-dimensional shape or be essentially two-dimensional (naturally having a finite thickness).

At 110, two electrically conductive elements are obtained. The two electrically conductive elements may, preferably, be electrically conductive patches or planar coils, such as comprising copper, metal mesh, indium tin oxide (ITO) or similar. The shape of an electrically conductive element may be, for example, a square, rectangular, circular or oval. The elements may be comprised of one or several electrically connected parts. The electrically conductive elements may, preferably, be such they may advantageously be utilized as antennas, e.g. for operating in a wireless local area network (WLAN), or as a capacitive sensing device, e.g., as a gesture sensor, or as a coupled inductor in case of planar coils. Particularly in case of the capacitive sensing device, at least one of the electrically conductive elements may comprise several electrically connected parts, for example, four rectangular parts which may be arranged to form a square or a rectangle, i.e. the receive electrode (Rx), for forming, in connection with the transmit electrode (Tx), the sensing space of the sensing device.

At 110, the electrically conductive elements, such as contact pads, traces, patches, planar coils or conductors may be provided to a desired location or locations on a, preferably flexible, substrate film or films by printing, for example, and electronic components may be attached by appropriate mounting technique, respectively. Flexible printing circuits (FPC) structure may be thus formed. Mounting may include using adhesive, paste and/or conductive ink for establishing and securing the desired mechanical and electrical connections, for instance. Item 110 may be executed repeatedly or alternately, depending on the embodiment, whereupon their separation into dedicated execution phases is not always necessary or even possible.

According to an embodiment of the present invention in particular, at least one of the electrically conductive elements may be arranged on a substrate film obtained at step 105, for example, by screen printing. According to another embodiment, both of the electrically conductive elements may be arranged on different substrate films obtained at step 105, for example, by screen printing. Advantageously, the molding material may be molded at step 130 between the substrate films, thus, preferably, embedding the electrically conductive elements arranged such that either one of the elements is comprised in different substrate film, i.e., one element per film.

According to various embodiments, the electrically conductive elements may be typical contact pads, comprise several contact pads, be a conductive surface, e.g., of a printed circuit board (PCB), the electrically conductive elements may comprise one or several conductive layers or elements.

At optional step 115, forming, such as thermoforming or cold forming, e.g., by press forming or using vacuum or pressure, may take place. During the forming, the, preferably flexible, substrate film(s), may be shaped to a desired substantially three-dimensional shape utilizing the mold structure. If some electronics components have been arranged on the substrate film(s) to be formed, they shall have been disposed preferably so as to avoid locations of greatest stress occurring during forming, such as the locations of greatest pressure or curvature.

At 120, the electrically conductive elements are arranged at a pre-defined distance from each other, such as inside of a cavity defined by a mold structure, for establishing an electromagnetic coupling, such as a capacitive or an inductive coupling, between the electrically conductive elements. This may be implemented by utilizing a mold structure having such properties that when the electrically conductive elements are arranged on opposite sides of the cavity of the mold structure and the mold structure is prepared for molding, such as by bringing the cavity plates or mold parts together to form the mold cavity, the electrically conductive elements are moved into positions having the pre-defined distance with respect to each other. However, the distance may at this point somewhat differ from the pre-defined distance, but may be established then once the molding material is injected into the mold cavity and at least between the electrically conductive elements. According to another embodiment of the present invention, the electrically conductive elements may be arranged at the pre-defined distance from each other by utilizing additional elements arranged into the mold cavity, such as, a non-conductive support member, such as a spacer or spacers, ensuring that the pre-defined distance between the electrically conductive elements is maintained during the molding. The support member may preferably be such that the volume between the electrically conductive elements is mainly to be filled with the molding material, not the support member. The support member may, for example, be attached to the electrically conductive elements at one or more sides of the elements, especially, in case of square-shaped elements.

Figure 2:
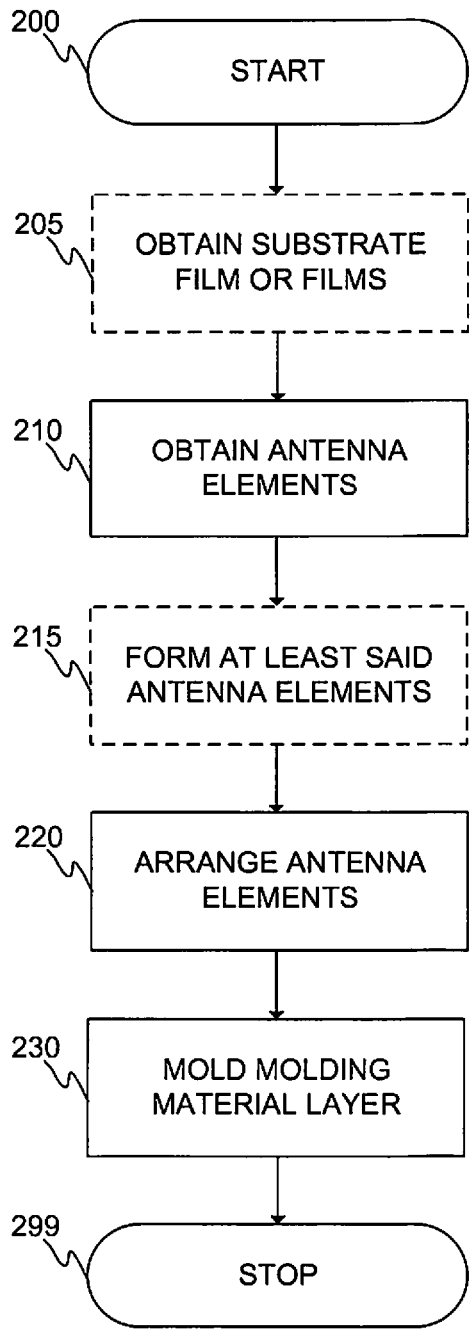
FIG. 2 illustrates a flow diagram of a method in accordance with an embodiment of the present invention.
Figure 3:
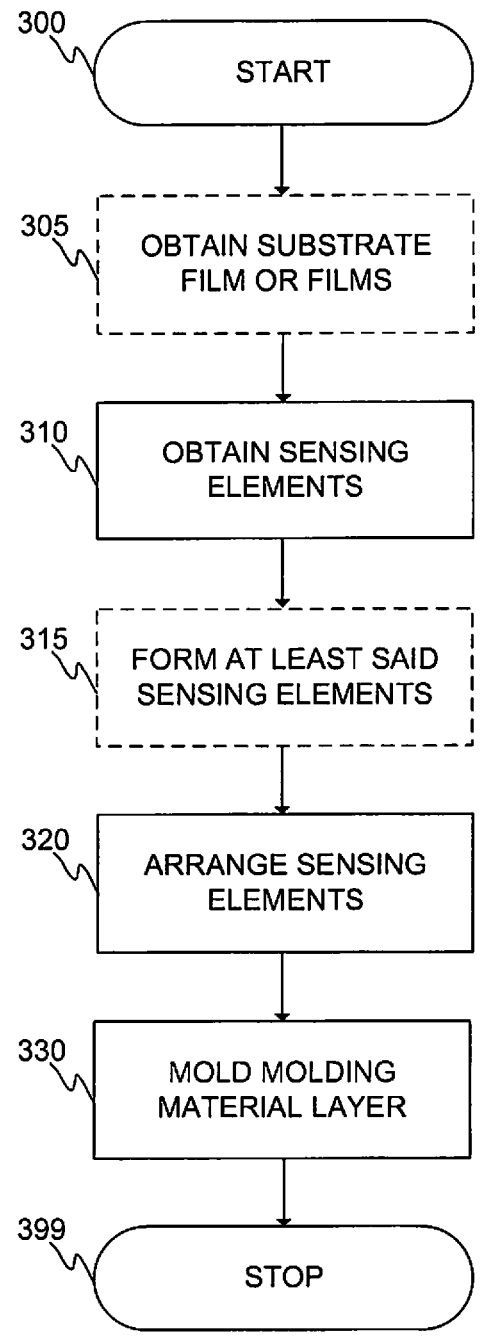
FIG. 3 illustrates a flow diagram of a method in accordance with an embodiment of the present invention.

There may be different criteria for defining the pre-defined distance between the electrically conductive elements. This may depend on the application. For example, in case of utilizing the electrically conductive elements to form an antenna structure, as illustrated in FIG. 2, the pre-defined distance may be defined based on the desired operational characteristics of the antenna or other aspect related to the antenna design for obtaining the desired operational characteristics. These characteristics may include, for example, frequency band of the antenna, frequency bandwidth and optimization of the impedance matching. In case of utilizing the electrically conductive elements as a part of a capacitive sensing device, as illustrated in FIG. 3, the considerations may differ from those related to the manufacturing of an antenna structure. The considerations related to the capacitive sensing device may include, for example, the distance from the Rx electrode from the Tx electrode which affects the shielding capability of the Tx electrode, or the permeability of the molding material, or a desirable sensor signal strength which advantageously increases when the distance is increased, or the desired capacitances of the assembly. Furthermore, in case of a coupled inductor, the pre-defined distance may be chosen by the desired inductance of the inductor, for example, in order to maximize the inductance or at least the mutual inductance between the coils. This may be affected by the amount of conductive layers of the planar coil(s), spacing between the turns of the coil(s), the width of the conductor forming the planar coil(s), number of turns in the planar coil(s), or the diameter or size of the planar coils with respect to each other or the horizontal displacement between the planar coils, if they are not arranged directly on top of each other in the vertical direction, that is, perpendicular to the horizontal direction defined by the plane of the planar coil. Also magnitude and/or shape of the surface areas inside the planar coils with respect to each other may affect the designing of the pre-defined distance.

Furthermore, the defining of the pre-defined distance may, preferably, occur before any machinery or materials have been obtained. It may be necessary to define the pre-defined distance before designing and/or obtaining the mold structure, that is, even before steps 100, 200, 300 in FIGS. 1-3, respectively, because the cavity of the mold structure may then be utilized for arranging the electrically conductive elements at the pre-defined distance from each other, or for arranging the electrically conductive elements at least to be disposed at the pre-defined distance from each other after the molding of the molding material layer at least between said elements. For example in case of an antenna structure, the pre-defined distance may be determined based on the desired frequency band of the antenna, the desired frequency bandwidth or the optimization of the impedance matching. Other aspect affecting the defining of the pre-defined distance may relate to materials used in, for example, the substrate films, if any, the antenna elements, or the molding material layer. Furthermore, the size, shape and location of the antenna elements or, for example, a grounding element additional with respect to the antenna elements may also affect the defining of the pre-defined distance.

Although illustrated in FIG. 1 to be performed prior to step 120, step 115 may be performed at or after step 120 or later during the method flow, however, prior to or at latest simultaneously with step 130, i.e., the molding. According to one example, step 115 may be performed such that the molding material which is to be injected with high pressure will form the electrically conductive members arranged inside the cavity defined by the mold structure.

At 130, a preferably plastic layer, e.g. of thermoplastic, thermosetting, elastomeric material, polymer, organic, biomaterial, composite, such as organic or graphic, as well as any combination thereof, is molded, preferably using injection molding, at least between said electrically conductive elements. The molding material layer, thus, has a thickness between said electrically conductive elements defined by the pre-defined distance.

Injection molding may be applied in the manufacturing process. The substrate and optionally the protective layer(s) (if already present) may be used as an insert in the mold structure or mold. Optionally, multi-shot or multi-component molding is applied to provide e.g. multiple materials to the multilayer structure. Plastic layer may be at least partially optically transparent and/or comprise recesses or through-holes to provide visual path to the underlying electronics that may include optoelectronic components (light-emitting diodes (LEDs), photosensitive detectors) or e.g. a display such as OLED (organic LED) display. The plastic layer may additionally or alternatively contain opaque, e.g. colored or graphics-containing, or translucent portions. The plastic player may be further provided with surface relief forms or other features for various purposes, such as for optical use (e.g. light incoupling, outcoupling, scattering, or reflection).

At 199, the method execution is ended. The electronic assembly manufactured may be taken out of the mold structure once the molded material has been solidified enough, usually affected by the temperature of the molding material.

According to some embodiments, an additional layer may also be, for example, laminated, such as by using adhesives, onto the molded material layer or onto at least one of the substrate films after the molding, depending on the particular embodiment and/or the intended use of the resulting object.

FIG. 2 illustrates a flow diagram of a method in accordance with an embodiment of the present invention. The corresponding method steps may be performed as in FIG. 1, but according to this embodiment an antenna structure is the target of the manufacturing process and may thus require specific considerations. The method starts at 200 essentially corresponding to step 100. At the optional step 205, a substrate film or films may be obtained such as at step 105. The substrate film(s) or sheet(s) may preferably be made of materials having electrically low losses, that is, low permittivities, thus minimizing concentration of the electromagnetic field of the antenna to the substrate film(s) or sheet(s) and reducing attenuation of the field in the film(s) or sheet(s). At step 210, two antenna elements may be obtained. These are preferably patches or patch-like conductive areas well-suited for antenna operation of antennas arranged into molded structures. Antenna elements such as these are especially useful to be utilized in antenna structures having capacitive coupling between its elements and molding material at least between the antenna elements. At the optional step 215, at least the antenna elements, or said elements and the substrate film or films comprising said elements may be formed, such as, by utilizing thermoforming, air pressure or press forming. Steps 205-215 may be combined such that the formed or shaped substrate films having the antenna elements are obtained, or just the combination of steps 210 and 215, that is, obtaining formed or shaped antenna elements.

Suitable materials for antenna elements, especially by utilizing printed electronics, may be, for example, materials comprising silver, such as Dupont® ME101, or Asahi® SW1600C.

At step 220, the antenna elements may be arranged at the pre-defined distance from each other or at least so that after the molding of the molding material layer at least between the antenna elements the elements are to reside at the pre-defined distance from each other. Preferably, the antenna element designated as the antenna radiator may be arranged such that it is to be located at the outer edge of the antenna structure with respect to the environment in the intended use of the structure, for example, in case of a device comprising an enclosure having an inside space or inner side defined by the enclosure, and the outer side. It is advantageous to have as little material as possible between the antenna radiator and the volume into which the field, that is, the responsive field, of the antenna is primarily intended to be generated, that is, the environment. The antenna element designated as the antenna feeding element may, preferably, be arranged to locate at the inner edge of the antenna structure, that is, in typical cases on the opposite side of the molding material layer with respect to the antenna radiator.

As mentioned hereinabove, aspects such as materials or desired frequency band of the antenna, the desired frequency bandwidth or the optimization of the impedance matching may affect the magnitude of the pre-defined distance. At step 230, the molding material layer may be molded at least between said antenna elements. The molding material may, preferably, be of material having electrically low losses, that is, low permittivity, thus minimizing concentration of the electromagnetic field of the antenna to the substrate film(s) or sheet(s) and reducing attenuation of the field in the film(s) or sheet(s). At step 299, the method execution may be stopped resulting in an antenna having capacitively connected or coupled antenna elements and molding material layer at least between the elements.

According to an embodiment of the present invention, a third antenna element may be obtained and arranged, for example, parallel and adjacent to the first or the second antenna element for operating as a ground element of the antenna. The ground element may, preferably, be arranged on the inner edge, that is, on the same side as of the molding material layer as the feeding element of the antenna structure. The ground element may, advantageously, be used for radiation directing purposes.

Different kinds of slot antennas within two-layer stacked structure are very well doable by utilizing an embodiment of the method according to the present invention.

FIG. 3 illustrates a flow diagram of a method in accordance with an embodiment of the present invention. The corresponding method steps may be performed as in FIG. 1, but according to this embodiment a capacitive sensing device is the target of the manufacturing process and may thus require specific considerations. The method starts at 300 essentially corresponding to step 100. At the optional step 305, substrate films may be obtained such as at step 105. At step 310, preferably two sensing elements may be obtained. These are preferably patches or patch-like conductive areas well-suited for capacitive sensing of sensing devices arranged into molded structures. Sensing elements such as these are especially useful to be utilized in sensing devices having capacitive coupling between its elements and molding material at least between the sensing elements. At the optional step 315, at least the sensing elements, or said elements and the substrate film or films comprising said elements may be formed, such as, by utilizing thermoforming, air pressure or press forming. Steps 305-315 may be combined such that the formed or shaped substrate films having the sensing elements are obtained, or just the combination of steps 310 and 315, that is, obtaining formed or shaped sensing elements.

Preferably, the sensing element designated as the Rx electrode may be arranged such that it is to be located at the outer edge of the sensing device structure with respect to the environment in the intended use of the structure, for example, in case of a device comprising an enclosure having an inside space or inner side defined by the enclosure, and the outer side. It is advantageous to have as little material as possible between the Rx electrode and the volume into which the sensing space of the sensing device is primarily intended to be generated. The sensing space is the space which is sensitive to, for example, to recognize movement of human hand within the space. At least the Rx electrode may, preferably, be comprised by several Rx electrode elements forming a shape, such as a square, rectangular, circular or oval, having empty space inside the area defined by said electrode elements. Tx electrode may, advantageously, be arranged at least at the corresponding areas with respect to Rx electrode for shielding the Rx electrode. Tx electrode, therefore, also defined similar empty space, preferably, slightly smaller than the empty space defined by the Rx electrode. However, Tx electrode may also be solid element, thus not having said empty space. The electrical connections of between the elements of the Rx electrode may, preferably also run at corresponding areas with the Tx electrode so that the Tx electrode provides shielding for the electrical connectors as well.

The sensing element designated as the Tx electrode may, preferably, be arranged to locate at the inner edge of the sensing device structure, that is, typically on the opposite side of the molding material layer with respect to the Rx electrode.

Rx and Tx electrodes of the capacitive sensing device may be made of any conductive material such as copper, metal mesh, ITO or similar. The electrical insulation between the electrodes may advantageously be achieved with the molding material molded at step 330. An optional cover layer on top of the electrode may, preferably, be non-conductive as well.

At step 320, the sensing elements may be arranged at the pre-defined distance from each other or at least so that after the molding of the molding material layer at least between the sensing elements they are to reside at the pre-defined distance from each other. As mentioned hereinabove, aspects such as materials or the desired capacitances, the distance from the Rx electrode from the Tx electrode which affects the shielding capability of the Tx electrode or the permeability of the molding material, or a desirable sensor signal strength, which advantageously increases when the distance is increased, may affect the magnitude of the pre-defined distance. At step 330, the molding material layer may be molded at least between said sensing elements. At step 399, the method execution may be stopped resulting in a capacitive sensing device, such as a gesture sensor, having capacitively connected sensing elements and molding material layer at least between the elements.

According to an embodiment of the present invention, a third sensing element may be obtained and arranged, for example, at the different side of the Tx electrode with respect to the Rx electrode for operating as a ground element of the sensing device, or to provide a "boosted" sensing device. The molding material may be used between the Tx electrode and the ground element, or alternative some other insulating material. The ground element may, advantageously, be used for shielding the Rx electrode and/or Rx feeding lines. The sensing elements' shape may be square, rectangular, circular or oval.

According to an embodiment of the present invention, the antenna structure and the capacitive sensing device may be incorporated in one molded structure, i.e., electronic assembly. In this case the Tx electrode of the capacitive sensing device may operate also as an antenna ground element. This will advantageously provide more design freedom and save space, advantageously, without degrading the performance of both functions. The achieved structure is simple and mechanically robust and comprises both functions: functions of the antenna and the capacitive sensing. The molding material layer may, in this case, be molded between at least the antenna elements and the sensing elements simultaneously, thus resulting in a simple and robust structure having advantageously only one molding step.

According to various embodiment of the present invention, the antenna structure and the capacitive sensing device may be incorporated in one molded structure, i.e., electronic assembly. The antenna elements may be arranged to reside in the empty space defined at least by the Rx electrode as described hereinabove. This will yield a compact and robust structure having both of the functionalities: the functions of antenna and capacitive sensing. The Rx electrode may, preferably, reside on the same side of the molding material layer as the antenna element designated as the antenna radiator. The molding material layer may, in this case too, be molded simultaneously between at least the antenna elements and the sensing elements, thus resulting in a simple and robust structure having only one molding step. According to another embodiment, the antenna elements and the capacitive sensing elements may be arranged to reside parallel to each other, thus resulting in a simple and robust structure having only one molding step.

Figure 4:
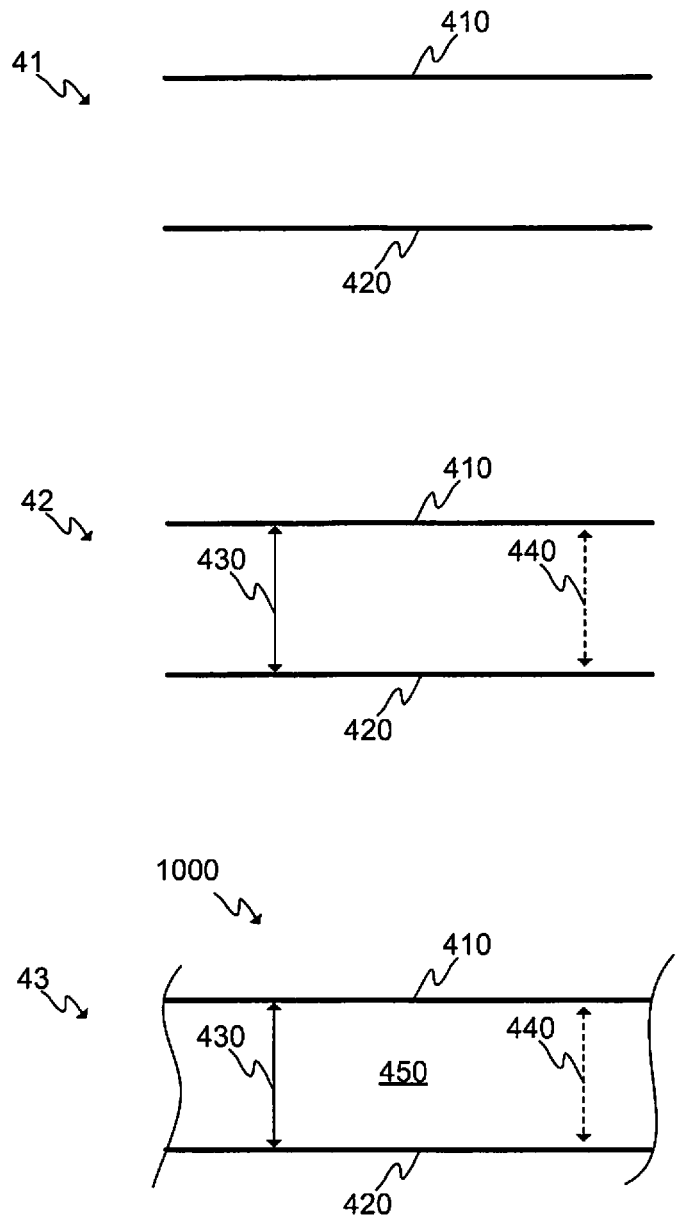
FIG. 4 illustrates an electronic assembly according to an embodiment of the present invention.

FIG. 4 illustrates an electronic assembly 1000 electronic assembly 1000 according to an embodiment of the present invention. At 41, the electrically conductive elements 410, 420, such as electrically conductive patches or planar coils, may be obtained. At 42, said elements 410, 420 may be arranged at a pre-defined distance 430 from each other for establishing an electromagnetic coupling 440, such as a capacitive or an inductive coupling, between said elements 410, 420. At 43, the molding, such as by injection molding, of the molding material layer 450 at least between said elements 410, 420 may take place resulting, preferably after the molding material have solidified, in electronic assembly 1000 in accordance with an embodiment of the present invention.

Figure 5:
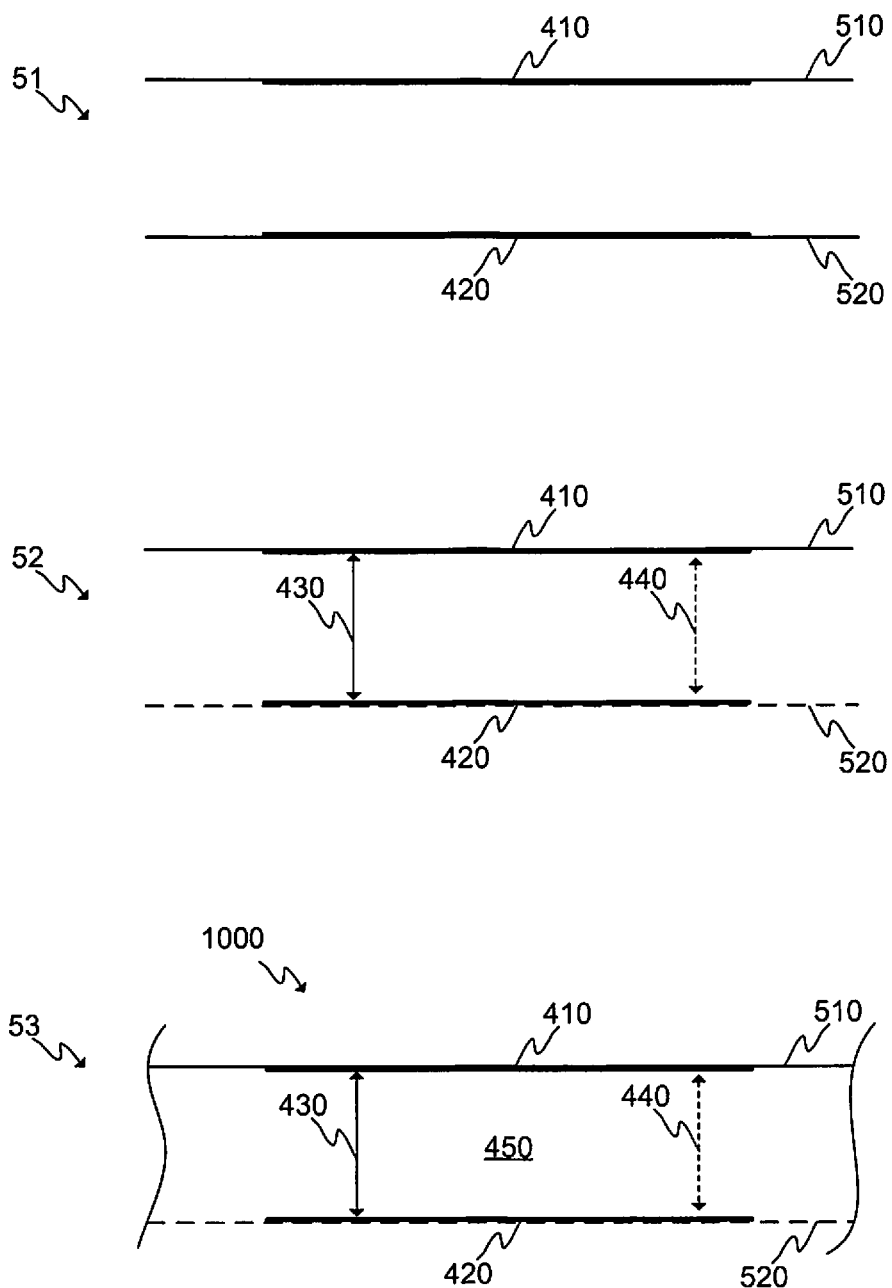
FIG. 5 illustrates an electronic assembly according to an embodiment of the present invention.

FIG. 5 illustrates an electronic assembly according to an embodiment of the present invention. At 51, the electrically conductive elements 410, 420, such as electrically conductive patches, may be obtained as formed or provided into or onto substrate films 510, 520. The electrically conductive elements 410, 420 may preferably have been provided on the substrate films 510, 520, such as by screen printing. At 52, said elements 410, 420 on said substrate films may be arranged at a pre-defined distance 430 from each other for establishing the electromagnetic coupling, such as capacitive or inductive, coupling 440 between said elements 410, 420. At 53, the molding, such as by injection molding, of the molding material layer 450 at least between said elements 410, 420 and the film substrates may take place resulting, preferably after the molding material have solidified, in electronic assembly 1000 in accordance with an embodiment of the present invention.

Figure 6:
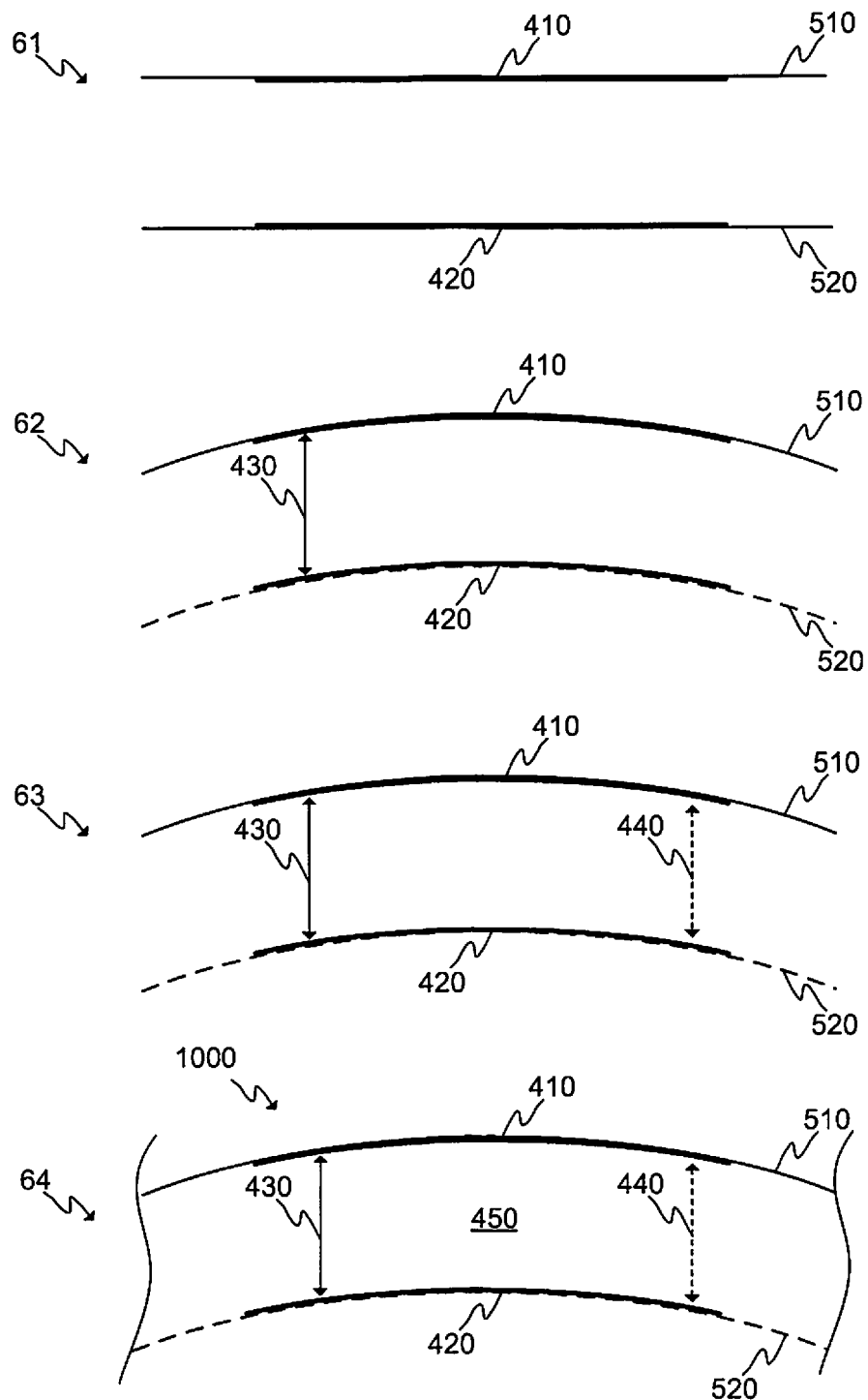
FIG. 6 illustrates an electronic assembly according to an embodiment of the present invention.

FIG. 6 illustrates an electronic assembly 1000 according to an embodiment of the present invention. At 61, the electrically conductive elements 410, 420, such as electrically conductive patches, may be obtained along with substrate films 510, 520. The electrically conductive elements 410, 420 may preferably have been formed on the substrate films 510, 520, such as by screen printing. At 62, at least the electrically conductive elements 410, 420 may be formed, such as thermoformed or cold-formed, to a three-dimensional shape. Preferably, the substrate films 510, 520 may also be formed simultaneously with the electrically conductive elements 410, 420. At 63, said elements 410, 420 on said substrate films may be arranged at a pre-defined distance 430 from each other for establishing the electromagnetic coupling, such as capacitive or inductive, coupling 440 between said elements 410, 420. At 64, the molding, such as by injection molding, of the molding material layer 450 at least between said elements 410, 420 and the film substrates 510, 520 may take place resulting, preferably after the molding material have solidified, in electronic assembly 1000 in accordance with an embodiment of the present invention.

FIGS. 7A and 7B illustrate an electronic assembly 1000, that is, an antenna structure, according to an embodiment of the present invention. FIGS. 7A and 7B illustrate antenna structure from two opposite directions in accordance with an embodiment of the present invention. In FIG. 7A the antenna structure is shown from a first side, for example, the above, and in FIG. 7B from a second side, for example, from below, which is opposite to the first side. The antenna radiator 710, that is, the first antenna element 710, may, preferably, reside on the outer side of the electronic assembly 1000 with respect to the environment in which the antenna structure is intended to be utilized. Antenna feeding element 720, that is, the second antenna element 720, may, preferably, reside on the inner side of the electronic assembly 1000 with respect to the environment in which the antenna structure is intended to be utilized, for example, inside of an enclosure, if any, of the electronic assembly 1000. The signal feeding element(s) 730 may, preferably, be connected to the antenna feeding element 720. There may be only one signal feeding element 730 or two or any number depending on the application. There may also be a third antenna element 735, for example, a ground element of the antenna, arranged, preferably prior to the molding, on the same side of the molding material layer 450 to be produced than the first 710 or the second 720 antenna element. In FIGS. 7A and 7B, the ground element 735 is shown to reside on the same side of the molding material layer 450 as the second antenna element 720. As can be seen, if the ground element 735 is parallel or arranged on the same surface as the first 710 or the second 720 antenna element, they should not be directly in galvanic connection, that is at least separated by an empty area of the surface on which they have been arranged, in order to obtain the desired characteristics for the antenna. According to the embodiment in FIG. 7B, this is achieved by a ground element 735 having a hole for the second antenna element 720. The ground element 735 may advantageously be utilized, for example, for radiation directing purposes.

FIGS. 8A and 8B illustrate an electronic assembly 1000, that is, a capacitive sensing device, according to an embodiment of the present invention. FIGS. 8A and 8B illustrate capacitive sensing device from two opposite directions in accordance with an embodiment of the present invention. In FIG. 8A the electronic assembly 1000 is shown from a first side, for example, from above, and in FIG. 8B from a second side, for example, from below, opposite to the first side. The first and the second sides may or may not be equivalent to the first and second sides with respect to the sides defined with respect to FIGS. 7A and 7B. The Rx electrode of the capacitive sensing device 810, that is, the first sensing element 810, may, preferably, reside on the outer side of the electronic assembly 1000 with respect to the environment in which the sensing device is intended to be utilized. The Tx electrode 820, that is, the second sensing element 820, may, preferably, reside on the inner side of the electronic assembly 1000 with respect to the environment in which the sensing device, such as a gesture sensor, is intended to be utilized, for example, inside of an enclosure, if any, of the electronic assembly 1000.

In FIGS. 8A and 8B, the Rx electrode 810 and, particularly its electrically connected elements, may be utilized to generate the sensing space which is advantageously sensitive to sense movement of, for example, human hand within the sensing space. Electrical connecting elements 730 may preferably be arranged to run between the Rx and Tx electrodes, or essentially close to the elements of the Rx electrode 810. The elements of the Tx electrode 820 may, preferably, also be electrically connected to each other (connections not shown in FIGS. 8A and 8B). The elements of the Rx electrode 810 may defined an empty space 830 or empty area 830 substantially in the plane defined by said elements, the shape of which depends on the particular shape of the Rx electrode 810. The Tx electrode 820 may, preferably, be arranged on the corresponding areas of the Rx electrode in order to shield the Rx electrode at least alleviated interferences possibly affecting the operation of the sensing device. Although in FIGS. 8A and 8B the empty space 830 or empty area 830 is shown in the center of the Tx electrode, the Tx electrode may also be a solid electrode, not having the empty space or area 830.

According to an embodiment of the present invention, the electronic assembly 1000 may be configured to be utilized as an antenna and a capacitive sensing device by utilizing the first and the second electrically conductive elements. The utilization may be based on bandwidth or time-based separation methods. In the case of bandwidth separation, different frequencies or frequency bands may be used for the antenna operation with respect to the capacitive sensing operation.

The different frequencies or frequency bands may advantageously sufficiently separated with respect to each other in order to avoid the antenna and capacitive sensing operation interfering each other. The antenna may be configured to operate, for example, at frequencies about 2.4 GHz, that is, at a higher frequency, whereas the capacitive sensing device may be configured to operate at frequencies about 15 kHz or 500 kHz, that is, at a lower frequency with respect to the higher frequency, for instance, thus providing sufficient separation between operating frequencies. In the case of time-based separation, the electronic assembly 1000 may be configured to operate as antenna during a first time period and as a capacitive sensing device during a second time period, not overlapping with the first time period.

A controlling unit 840 for controlling the operation of the electronic assembly 1000 may be configured to execute one or both of the abovementioned separation methods. The controlling unit 840 may, preferably, be the same unit or at least part of it, which is designed to control the operation of the electronic assembly 1000 in general. However, there may also be a separate, designated controlling unit just for the particular part of the electronic assembly 1000, that is, for the antenna, capacitive sensing device or coupled inductor, for instance. Thus the controlling unit 840, either a designated or for the whole electronic assembly 1000, may be used in connection with all embodiments of the present invention, although described herein in connection with antennas and capacitive sensing devices. The unit 840 is thus also utilizable in connection with coupled inductors and the like. The controlling unit 840 may comprise such components as ICs, passive electronic components, electrical converters and/or inverters (for example, for producing alternating current to be injected into the coupled inductor), conductors, etc.

The bandwidth separation may be implemented simple by feeding the electrically conductive element(s) with a signal comprising the desired frequencies having sufficient separation. This may include using filters and/or separate signal feeding elements 730 connected to separate signal generation means for generating the signal, for example, to different controller outputs or control units 840. The signal may comprise, for example, different Fourier components residing on the desired frequency bands. Time separation method may be simple configured, for example, by reserving separate time slots for feeding the conductive element(s) with a suitable frequency for antenna operation and another time slots for feeding the conductive element(s) with a suitable frequency for capacitive sensing operation.

FIG. 9 illustrates an electronic assembly 1000 according to an embodiment of the present invention. According to this embodiment, both the antenna structure and the capacitive sensing device may be comprised in the same electronic assembly. According to this embodiment, the antenna elements 710, 720 are arranged to align with the empty space 830 defined by the Rx and Tx electrodes. The antenna elements 710, 720 may, preferably, be arranged to have the same defined distance from each other with respect to the distance between the sensing elements 810, 820. However, as shown in FIG. 9, the sensing elements 810, 820 may be arranged adjacent to each other and may thus have different distance from each other with respect to the distance between the antenna elements 710, 720. It is also visible from FIG. 9 that the signal feeding element, for example, in connection with the controlling unit 840 of electronic assembly 1000, of the Rx electrode may also be arranged to align with the empty space 830 in vertical direction, that is, the direction substantially perpendicular with respect to the planes defined by the Rx 810 and/or Tx 820 electrodes.

According to still another embodiment of the present invention, the Tx electrode 820 of the capacitive sensing device may operate as the ground element for the antenna, for example, for radiation directing purposes.

Figure 10:
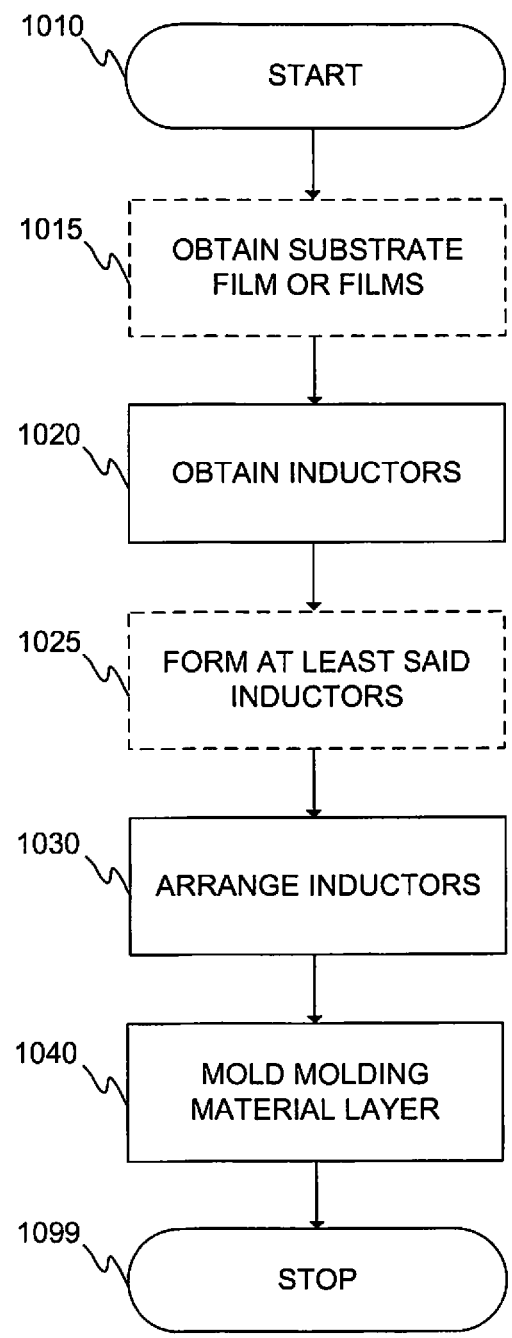
FIG. 10 a flow diagram of a method in accordance with an embodiment of the present invention.

FIG. 10 illustrates a flow diagram of the method according to an embodiment of the present invention. The corresponding method steps may be performed as in FIG. 1, but according to this embodiment a coupled inductor is the target of the manufacturing process and may thus require specific considerations. The method starts at 1010 essentially corresponding to step 100. At the optional step 1015, substrate films may be obtained such as at step 105. At step 1010, preferably two planar inductors or coils may be obtained. The planar inductors or coils are especially useful to be utilized in coupled inductors having mutual inductive between said inductors and molding material at least between said inductors. At the optional step 1015, at least the planar inductors, or said inductors and the substrate film or films comprising said inductors may be formed, such as, by utilizing thermoforming, air pressure or cold forming, such as press forming. Steps 1015-1025 may be combined such that the formed or shaped substrate films having the inductors are obtained, or just the combination of steps 1015 and 1025, that is, obtaining formed or shaped inductors. The shape of the inductors may be, for example, a square, rectangular, circular or oval.

Preferably, the first inductor may be arranged such that it is to be located at the outer edge of the electronic assembly 1000 with respect to the environment in the intended use of the electronic assembly 1000, for example, in case of a device comprising an enclosure having an inside space or inner side defined by the enclosure, and the outer side. It is advantageous to have as little material as possible between the first inductor and the volume into which the responsive magnetic field of the coupled inductor is primarily intended to be generated. The second inductor may, preferably, be arranged to locate at the inner edge of the coupled inductor structure, that is, typically on the opposite side of the molding material layer with respect to the first inductor.

The inductors of the coupled inductor may preferably be arranged to maximize the mutual inductance between the inductors. This may advantageously entail displacing them at corresponding positions with respect to each other. It may be beneficial to have planar inductors defining substantially the same inner spaces, that is, the surface of the space defined by the planar coil at the inner edge of the inductor, with respect to each other in order for the mutual magnetic flux to flow effectively through both of the planar inductors.

The planar inductors of the coupled inductor may be galvanically coupled to each other or said inductors may be utilizable separately, thus, for example, having separate feeding elements, according to some embodiments of the present invention. The galvanic connection between the planar inductors may have been established before the molding or may be established after the molding. The galvanic connection may be provided by screen printing or by a separate conductor.

The planar coils of the coupled inductor may be made of any conductive material such as copper, metal mesh, ITO or similar. The electrical insulation between the coils, in case of non-galvanically coupled coils, may advantageously be achieved with the molding material molded at step 1040. An optional cover layer on top of the inductors may, preferably, be non-conductive as well.

At step 1030, the inductors, such as planar coils, may be arranged at the pre-defined distance from each other or at least so that after the molding of the molding material layer at least between the inductors they are to reside at the pre-defined distance from each other. As mentioned hereinabove, aspects such as the amount of conductive layers of the planar coil(s), spacing between the turns of the coil(s), the width of the conductor forming the planar coil(s), number of turns in the planar coil(s), or the diameter or size of the planar coils with respect to each other or the horizontal displacement between the planar coils, if they are not arranged directly on top of each other in the vertical direction, that is, perpendicular to the horizontal direction defined by the plane of the planar coil. Also magnitude and/or shape of the surface areas inside the planar coils with respect to each other may affect the designing of the pre-defined distance.

At step 1040, the molding material layer may be molded at least between said inductors. At step 1099, the method execution may be stopped resulting in a coupled inductor, such as a transformer, wireless charging device, or an inductive antenna for communication, having mutually inductively connected inductors and molding material layer at least between the inductors, preferably, planar inductors.

According to various embodiments of the present invention, one or both the inductors may be comprised of a plurality of coils. There may also be more than two inductors according to various embodiments of the present invention. A third, or third and fourth, inductors may be arranged to be either at the pre-defined distance from each other or may have any distance, for example, depending on the overall electronic assembly to be performed. By having more than two inductors, the performance and/or the efficiency of the coupled inductor may be increased.

FIGS. 11A and 11B illustrate inductors according to two embodiments of the present invention.

FIG. 11A illustrates a planar inductor 410 having a circular shape and comprising a planar coil 1110 with a plurality of turns. As can be seen, the inductor 410 may exhibit 3D shape such as shown in FIG. 12 where the inductors are slightly convex/concave. The inductor 410 may also comprise first 1115A and second 1115B ends for injecting current through the inductor for generating a magnetic field. FIG. 11B illustrates a square-shaped planar inductor 410.

FIG. 12 illustrates an electronic assembly 1000, that is, a coupled inductor according to an embodiment of the present invention. The coupled inductor comprises the first inductor 410 and the second inductor 420. The inductors are arranged at the pre-defined distance 430 from each other. The inductors 410, 420 may preferably be arranged so that when excited with current, the inductors 410, 420 are in electromagnetic coupling or engagement, in this case via inductive coupling, with respect to each other. By injecting current through one of the inductors, the generated magnetic field and the flux thereof will flow through the other inductor, and induces a voltage to the other inductor. This is the basic principle of electrical transformers. However, injecting currents having same direction and phase through both of the inductors, the amplitude of the magnetic field may be increased. This is also true for coupled inductors having more than two inductors. The increase in the amplitude may be especially beneficial in case of using the coupled inductor as a wireless charging device, either transmitting or receiving electrical power, or both. Furthermore, the inductors may be used for exchanging information, that is, communicating with the environment into which the coupled inductor is intended to be arranged. Still another example is utilizing the inductors for transmitting data and/or electrical power through the molding material layer 450 which is molded at least between the inductors 410, 420 of the coupled inductor, especially if the first 410 and second 420 are not in galvanic connection with each other.

According to still another embodiment of the present invention, any two or even all three of antenna, capacitive sensing device and coupled inductor may be integrated into one object and, thus, yield a product having several functionalities and is manufactured utilizing only one molding step. The combination of all three of the abovementioned devices may use the combined solution of an antenna and a capacitive sensing device configured to be operated by frequency and/or time-based separation methods. The coupled inductor may in this be arranged adjacent to the other devices resulting. for example, a product having an antenna, capacitive sensor and wireless charging device.

A person skilled in the art shall know beforehand or determine by field testing the optimum process parameters in the light of used materials, dimensions and components. Few merely exemplary guidelines can be given for general guidance. When the substrate film(s) is/are PET and the plastics to be overmolded thereon is PC, the temperature of the melted PC may be between 280 and 320 degrees Celsius and applicable mold temperature may range from about 20 to 95 degrees Celsius, i.e. it may be about 80 degrees Celsius, for example. The used substrate film(s) and the process parameters shall be selected such that the substrate(s) remains substantially solid during the process.

Potentially preinstalled electronics have been preferably attached to the substrate such that they remain static during the molding. Optionally, roll-to-roll technique may be utilized during the execution of the manufacturing method at least for selected phases, such as the provision of the substrate with traces/components or the integration of layers together. Application of roll to roll requires some flexibility from the used material layers. Accordingly, the end product (the obtained multilayer structure or even a device ultimately hosting it) may be flexible. However, the present invention is in practice applicable also to scenarios with more rigid material sheets or generally, pieces of desired material.

The target electronic product or device incorporating the electronic assembly 1000, such as an antenna, a capacitive sensing device, or a coupled inductor, may include e.g. a consumer electronics device, industrial electronics, automation equipment, machinery, automotive product, safety or protection device, computer, tablet, phablet, mobile terminal such as cell phone, alarming device, wearable electronics/ product (garment, headwear, footwear, etc.), sensor device, measurement device, display device, game controller or console, lighting device, multimedia or audio player, audiovisual (AV) device, sports gear, communication device, transport or carrying equipment, battery, optical device, solar panel or solar energy device, transmitter, receiver, wirelessly controlled device, or controller device.

Features described in the preceding description may be used in combinations other than the combinations explicitly described. Although functions have been described with reference to certain features, those functions may be performable by other features whether described or not. Although features have been described with reference to certain embodiments, those features may also be present in other embodiments whether described or not.

The invention claimed is:
1. A method for manufacturing an electronic assembly for emitting an electromagnetic field of an antenna, the method comprising:

obtaining a plurality of electronic components, the plurality of electronic components including first and second electrically conductive elements;

determining a predefined distance between the first and second electrically conductive elements based on operational characteristics of the antenna including at least one of: frequency band, frequency bandwidth, or impedance matching;

arranging the first and second electrically conductive elements on at least one substrate film at the pre-defined distance between each other for establishing an electromagnetic coupling between the first and second electrically conductive elements;

selecting mounting locations along the at least one substrate film for mounting the plurality of electronic components, the mounting locations being at locations of the at least one substrate film other than a location of the at least one substrate film with the greatest curvature when formed such that none of the plurality of electronic components are mounted at the location with the greatest curvature;

mounting the first and second electrically conductive elements on the at least one substrate film before thermoforming the at least one substrate film to include a three-dimensional shape with curvatures; and molding a molding material layer at least between the first and second electrically conductive elements, wherein the molding material layer has a thickness between the first and second electrically conductive elements defined by the pre-defined distance, wherein at least one of the first or second electrically conductive elements has a curvature that matches a curvature of the respective mounting location of the at least one substrate film.

2. The method of claim 1, further comprising:
obtaining a first substrate film of the at least one substrate film; and
securing the first electrically conductive element to the first substrate film.

3. The method of claim 2, further comprising:
obtaining a second substrate film of the at least one substrate film; and
securing the second electrically conductive element to the second substrate film.

4. The method of claim 1, further comprising arranging a third electrically conductive element of the plurality of electronic components on the same side of the molding material layer as the first or the second electrically conductive element for operating as a ground element of the electronic assembly.

5. The method of claim 1, further comprising:
coupling an electrical energy feeding element to the first or the second electrically conductive element.

6. A method for manufacturing an antenna structure, the method comprising:

obtaining a plurality of electronic components, the plurality of electronic components including first and second antenna elements;

determining a predefined distance between the first and second antenna elements based on operational characteristics of the antenna structure including at least one of: frequency band, frequency bandwidth, or impedance matching;

arranging the first and second antenna elements on at least one substrate film at the predefined distance from each other for establishing a capacitive coupling between the first and second antenna elements;

selecting mounting locations along the at least one substrate film for mounting the plurality of electronic components, the mounting locations being at locations of the at least one substrate film other than a location of the at least one substrate film with the greatest curvature when formed such that none of the plurality of electronic components are mounted at the location with the greatest curvature;

mounting the first and second antenna elements on the at least one substrate film before thermoforming the at least one substrate film to include a three-dimensional shape with curvatures; and molding a molding material layer at least between the first and second antenna elements, wherein the molding material layer has a thickness between the first and second antenna elements defined by the predefined distance, wherein at least one of the first or second antenna elements has a curvature that matches a curvature of the respective mounting location of the at least one substrate film.

7. The method of claim 6, further comprising:
determining the predefined distance based on the frequency band.

* * * * *